Sept. 25, 1956 H. H. WOODSON 2,764,719
SERVO SYSTEM WITH MAGNETIC AMPLIFIER WITH INTEGRAL FEEDBACK
Filed July 15, 1953 2 Sheets-Sheet 1

INVENTOR
HERBERT H. WOODSON
BY
G. B. O'Brien
R. M. Hicks
ATTORNEYS

Sept. 25, 1956 H. H. WOODSON 2,764,719

SERVO SYSTEM WITH MAGNETIC AMPLIFIER WITH INTEGRAL FEEDBACK

Filed July 15, 1953 2 Sheets-Sheet 2

INVENTOR
HERBERT H. WOODSON

BY

G. D. O'Brien
R. M. Hicks
ATTORNEYS 2,764,719

SERVO SYSTEM WITH MAGNETIC AMPLIFIER WITH INTEGRAL FEEDBACK

Herbert H. Woodson, Takoma Park, Md., assignor to the United States of America as represented by the Secretary of the Navy Application July 15, 1953, Serial No. 368,243

11 Claims. (Cl. 318—28)

(Granted under Title 35, U. S. Code (1952), sec. 266)

The invention described herein may be manufactured and used by or for the Government of the United States of America for governmental purposes without the payment of any royalties thereon or therefor.

This invention relates to servo-systems and more particularly pertains to a servo system compensation circuit.

In a closed-loop regulatory system, an error signal which is a measure of the deviation of the actual state of the system from the desired state of the system is applied to a controller including an amplifier and a motor which drives the system in a direction to obtain correspondence between the actual state and the desired state. In a closed-loop servo system, the error signal is a measure of the displacement between the input and output shafts.

The use of a single proportional amplifier in the controller is not satisfactory in most high performance servo systems. Heretofore, it has been known to compensate the vacuum tube amplifiers by suitable feedback networks to obtain transfer functions having favorable dynamics. By the use of the appropriate type of feedback, it is possible to achieve lead, lag and integral compensation of the servo system.

The servo system error signal may be either a polarity reversible D.-C. voltage as would be derived from a source of D.-C. voltage associated with a pair of potentiometers or a phase-reversible amplitude-modulated A.-C. voltage such as would be derived from a synchro-transformer device. A D.-C. error signal may be applied to a direct connected electronic amplifier and the D.-C. output of the amplifier fed back through the equalizing network to the amplifier input to thereby achieve the desired compensation. However, because of the drift inherent in D.-C. electronic amplifiers, it has been customary to use A.-C. electronic amplifiers. This necessitates a modulator or chopper to convert the D.-C. signal to an A.-C. signal which may be amplified in an A.-C. amplifier. Further, there are certain advantages to utilizing A.-C. motors which could not be operated by the output of the D.-C. amplifier.

The signal which must be supplied to the equalizing networks in the feedback circuit must be a polarity reversible D.-C. voltage correlative with the error signal. Thus, the output of the A.-C. electronic amplifiers must be passed through a phase-sensitive demodulator to obtain a polarity reversible D.-C. output which is then applied to the compensating network, the output of the compensating network being applied through a phase-sensitive modulator or chopper to the A.-C. amplifier.

Alternatively, the A.-C. error voltage may be amplified and applied to a resonant network having the requisite characteristics, the output of the resonant network being applied through an A.-C. amplifier to the servomotor. The latter expedient however, has not proved satisfactory in those applications in which the carrier frequency of the A.-C. error voltage is subject to even slight changes, since the resonant network is highly frequency sensitive.

The present invention relates to a compensation circuit utilizing a magnetic amplifier to provide lead, lag or integral compensation for a servo system, which compensation circuit is responsive to either A.-C. or D.-C. error signals and which circuit provides an amplified output containing both A.-C. and D.-C. components which may be applied directly to an A.-C. or D.-C. servomotor or to the servomotor through a further amplifier. This is achieved by the use of a half-wave bridge type magnetic amplifier and the provision of a positive or negative integral feedback loop around the amplifier. The half-wave bridge type magnetic amplifier has an inherent speed of response of one cycle of the carrier frequency for a single stage amplifier with an additional half-cycle delay for each additional stage and consequently has the rapid speed of response necessary to a satisfactory servo system. In addition, the half-wave bridge magnetic amplifier is responsive to either suitably phased A.-C. or D.-C. signals, and provides a polarity reversible pulsating D.-C. output having both A.-C. and D.-C. components correlative with the amplitude and phase or polarity of the input.

The output of the half-wave bridge type magnetic amplifier thus provides an amplified output containing both A.-C. and D.-C. components which may be utilized to drive either A.-C. or D.-C. servomotor, or may be applied to a further amplifier without requiring a modulator or similar device to reconvert the output of the compensation circuit to the line frequency. Additionally, the D.-C. component may be applied directly to the integral feedback loop without the necessity of providing a demodulator. The compensation circuit employing the magnetic amplifier may be made highly frequency insensitive thereby obviating the difficulties encountered in those systems utilizing a resonant network.

An important object of this invention is to provide a lead, lag, or integral compensation circuit for servo systems which is responsive to both A.-C. and D.-C. error signals and which produces an output voltage having both A.-C. and D.-C components correlative with the amplitude and polarity of the error signal, which output signal may be utilized to drive either a servomotor or a further amplifier stage.

Another object of this invention is to provide a compensation or stabilization circuit for a servo system which functions as a phase-sensitive demodulator, when used with an A.-C. error signal, to produce a compensated D.-C. voltage correlative with the error signal, and which compensation circuits also produce a compensated A.-C. output signal correlative with the error signal.

A further object of this invention is to provide a servo system compensation circuit, in accordance with the foregoing object which circuit does not attenuate the error signal passed therethrough.

Yet another object of this invention is to provide a servo system compensation circuit which is not sensitive to fluctuations in the carrier frequency of the A.-C. error signal.

Other objects and many of the attendant advantages of this invention will be readily appreciated as the same becomes better understood by reference to the following detailed description when considered in connection with the accompanying drawings wherein.

Figure 1:
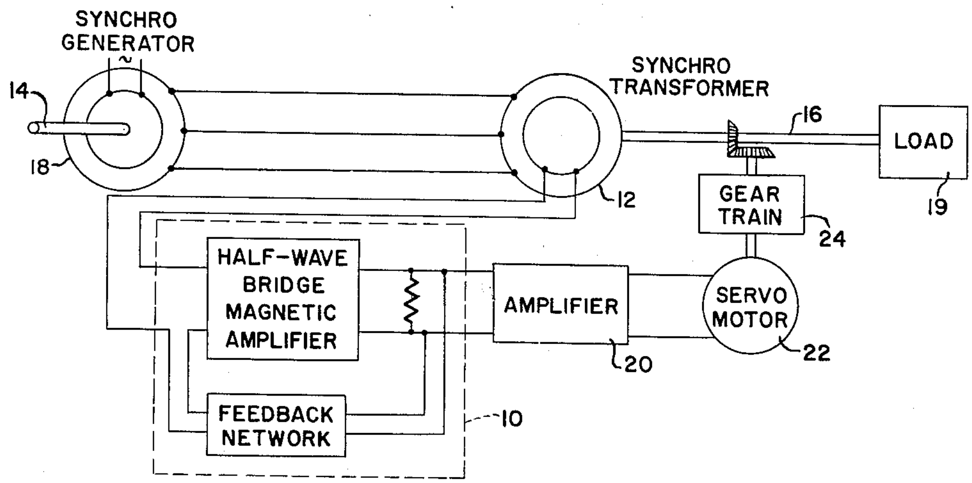
Fig. 1 is a block diagram of a servo system employing the improved compensation circuit of the present invention.

Referring to Fig. 1, the compensation circuit indicated generally by the numeral 10 is shown interposed in the main servo loop, which compensation circuit is adapted to provide lead, lag or integral compensation for the servo system, as determined by the compensation network parameters. The compensation circuit, which is responsive to both A.-C. and D.-C. signals is energized by a source of error voltage such as the synchro transformer 12, which synchro transformer produces an A.-C. error voltage correlative with the displacement between the input shaft 14 and the output shaft 16, which output shaft is coupled to the synchro transformer 12 and to a load 19. The output of the compensation network 10 is applied through an amplifier 20 to servo motor 22, which servo motor drives the output shaft 16 through a gear train 24. Alternatively, any other suitable system may be utilized for providing either an A.-C. or D.-C. error signal which varies in amplitude in accordance with the displacement between the input shaft 14 and the output shaft 16.

The compensation circuit 10 comprises a half-wave bridge type magnetic amplifier utilizing an integral feedback network to obtain lead, lag or integral compensation for the servo system. The half-wave bridge magnetic amplifier comprises a pair of cores of saturable magnetic material each having a control winding and controlled winding thereon, which controlled windings are arranged in separate parallel branch circuits and energized from a source of A.-C. potential. Unidirectional impedance elements are disposed in each of the branch circuits whereby current flows through the controlled windings only during one half cycle of the A.-C. potential, hereinafter referred to as the conducting half cycle of the bridge. The control windings on the reactors are arranged so that the flux levels in the saturable reactor elements are oppositely varied during the non-conducting half cycle of the bridge, in response to the application of an error signal to the control winding. In the half-wave bridge magnetic amplifier, responsive to either an amplitude modulated A.-C. signal, of a frequency equal to the power supply frequency, and to a variable D.-C. signal, is the same. Thus, the half-wave magnetic amplifier may be utilized with either A.-C. or D.-C. control.

The output of the half-wave bridge magnetic amplifier is zero when the error signal is zero and there is a pulsating D.-C. output voltage containing both A.-C. and D.-C. components when an error signal is applied to the control windings. The polarity of the output voltage of the half-wave bridge magnetic amplifier, and consequently the polarity of the D.-C. component of the output voltage and the phase of the A.-C. component of fundamental frequency of the output voltage is correlative with the amplitude and the polarity of the error signal.

In addition to the phase reversible output containing both A.-C. and D.-C. components correlative with the applied error signal, and the response to both A.-C. and D.-C. control signals, the half-wave bridge magnetic amplifier possesses the advantage of having an inherent speed of response of one cycle of the supply or carrier frequency, for the first stage of amplification, with an additional half cycle for each additional stage. This delay, in most servo systems, can be ignored, since this does not adversely affect the stability of the system.

Figure 2:
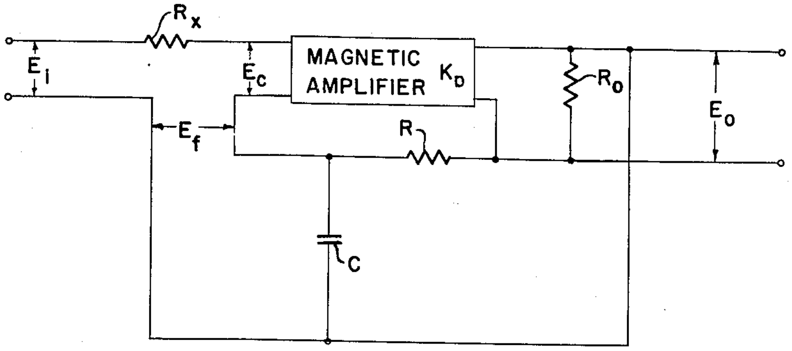
Fig. 2 is a diagrammatic view of the compensation circuit.

When the output of the amplifier is fed back through a resistance-capacitance integrating network as shown in Fig. 2, only the D.-C. component of the amplifier output will appear across the capacitor if the R-C time constant is long compared to the period of the amplifier output voltage, and the amplifier input resistance does not load the R-C network excessively. When there is some loading of the network by the amplifier input resistance, the feedback function will be changed from that of a simple R-C network. Whether or not there is loading of the network, the capacitor voltage is the input voltage to the amplifier from the feedback network. The feedback function relating the feedback voltage $E_f$ to the amplifier output voltage $E_o$ which is applied to the network is:

$$\frac{E_f}{E_o}=\frac{\alpha}{\alpha Tj\omega+1} \quad (1)$$

where $\alpha=Rc/R+Rc$; $T=RC$, and $Rc$ is the amplifier input resistance including the limiting resistance $Rx$ in the magnetic amplifier control circuit. Using the above value of feedback function, and neglecting the amplifier phase shift which is small in a 400 cycle amplifier at a signal frequency below 100 radians per second, the closed loop transfer function of Fig. 2 is:

$$\frac{E_o}{Ej}=\frac{K_D[\alpha Tj\omega+1]}{\alpha Tj\omega+1\pm dK_D} \quad (2)$$

where $K_D$ is the D.-C. gain of the amplifier. When the feedback of Fig. 2 is negative, Equation 2 reduces to:

$$\frac{E_o}{Ej}=\frac{\frac{K_D}{1+\alpha K_d}[\alpha Tj\omega+1]}{\frac{\alpha T}{1+\alpha K_D}j\omega+1} \quad (3)$$

This is a lead circuit with a lower break frequency $1/\alpha T$, break frequency spread $L+\alpha K_D$, and zero frequency gain $K_D/1+\alpha K_D$. This value of zero frequency gain is based on the assumption that the only usable portion of the output is the D. C. component. However, the output $E_o$ is a pulsating D. C. voltage and consequently when the output of the compensation circuit is fed directly into the input of a half-wave amplifier which responds to both A. C. and D. C. components, the zero frequency gain will be somewhat greater than that indicated by Equation 3.

When the phase shift around the loop of the lead network is 180° the loop gain must be less than one to insure stability. The complex loop gain is $$\frac{E_f}{E_e}=\frac{\alpha K_d e-T_A j\omega}{\alpha Tj\omega+1} \quad (4)$$

where $T_A$ is the amplifier time constant determined by the number of stages. For a practical circuit, 180° phase shift will occur where:

$$\alpha T\omega\gg 1 \quad (5)$$

in which case the phase shift of the denominator of Equation 4 is very nearly equal to $\pi/2$ radians. Thus, the phase shift of 180° will occur when:

$$T_A\omega=\frac{\pi}{2} \quad (6)$$

At the frequency determined by Equation 6 the magnitude of $E_f/E_e$ must be less than one, hence:

$$\frac{K_D}{T\omega}<1 \quad (7)$$

Equations 6 and 7 set the lower limit on the time constant T of the feedback network that can be used with a given amplifier gain $K_D$ to insure a stable lead network.

When the feedback in Fig. 2 is positive, and the zero frequency loop gain, $\alpha K_D$ is less than 1, Equation 2 becomes:

$$\frac{E_o}{E_i}=\frac{\frac{K_D}{1-\alpha K_D}[\alpha T'j\omega+1]}{\frac{\alpha T}{1+\alpha K_D}j\omega+1} \quad (8)$$

This is a lag network with upper break frequency $1/\alpha T$, break frequency spread $1/1+\alpha K_D$ and zero frequency gain $K_D/1-\alpha K_D$. As before, the zero frequency gain given by Equation 8 is on the basis of the D. C. component of the output. If both D. C. and A. C. components are used, as in driving another magnetic amplifier, the zero frequency gain will be somewhat higher than that indicated by Equation 8.

If the amplifier has sufficient gain that $\alpha K_D$ is greater than one, the feedback voltage may be taken from a tap on the output resistor $R_o$.

In this manner the proper lag characteristic may be obtained while keeping the maximum possible zero frequency gain. In this case, the feedback function is:

$$\frac{E_f}{E_e}=\frac{\alpha\alpha 1}{\alpha Tj\omega+1} \quad (9)$$

where 1 is the ratio of the voltage applied to the feedback network to the amplifier output voltage $E_o$. The transfer function for such a circuit is:

$$\frac{E_o}{E_i}=\frac{K_D[\alpha Tj\omega+1]}{\alpha Tj\omega+1-\alpha\alpha 1K_D} \quad (10)$$

When the feedback is positive and the factor $\alpha\alpha 1K_D$ is equal to one, the over-all transfer function is:

$$\frac{E_o}{E_i}=\frac{K_D[\alpha Tj\omega+1]}{\alpha Tj\omega} \quad (11)$$

For frequencies such that $\alpha T\omega \ll 1$, the circuit described by Equation 10 is an integrator with the transfer function:

$$\frac{E_o}{E_i}=\frac{K_D}{\alpha Tj\omega} \quad (12)$$

When a steady error signal is applied to this circuit, the output being proportional to the integral of the input signal, will build up until the amplifier saturates. Hence, a constant output voltage is obtained from this circuit only when the input voltage is zero. This type of transfer function when placed in a servo loop with the proper type of stabilization yields a zero-velocity-error system.

Whereas the previous analysis has been based on the use of an R–C circuit in the feedback loop around the amplifier, it is apparent that various other well known types of equalizing circuits may be utilized in the feedback loop. However, since the output of the half-wave bridge magnetic amplifier contains an A. C. component of the power supply frequency in addition to the D. C. component, it is preferable to use low-pass filters which provide positive or negative integral feedback depending on the polarity of the feedback. A high-pass filter network cannot be advantageously utilized, since it is necessary to precede the high-pass filter network with a smoothing filter to remove the A. C. component, which smoothing filter introduces a large phase-shift that cannot be compensated by the compensation network.

Figure 3:
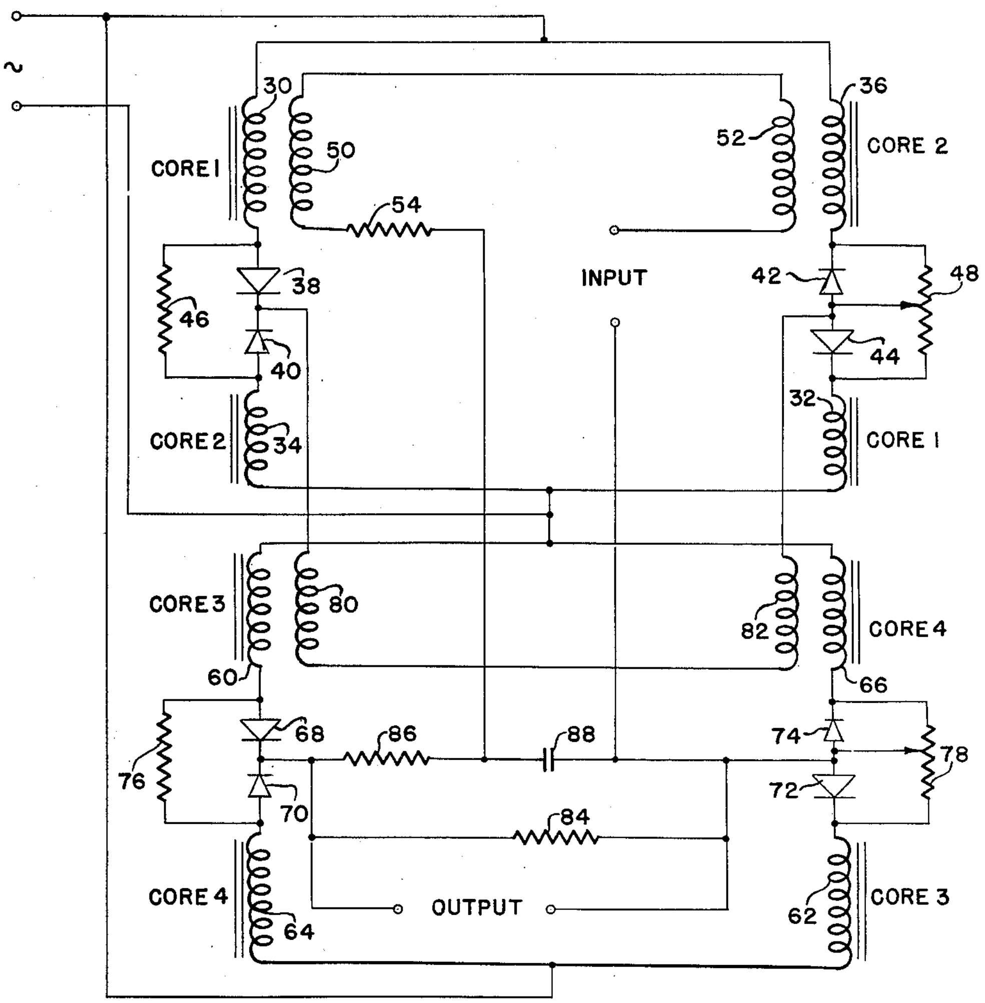
Fig. 3 is a schematic view of the compensation circuit.

A preferred form of compensation circuit utilizing a half-wave bridge type magnetic amplifier having a feedback network to provide compensation is illustrated in Fig. 3 and is of the type in which each of the legs of the bridge is formed by a controlled winding. Alternatively, other types of half-wave bridge circuits such as those employing a center tapped transformer in one pair of adjacent legs of the bridge may be utilized.

In the half-wave bridge type magnetic amplifier as illustrated in Fig. 3, it has been found desirable to use two stages of amplification to produce the requisite gain. The first stage comprises controlled windings 30 and 32 wound on a core of saturable magnetic material, designated core 1, and controlled windings 34 and 36 wound on the second core of saturable magnetic material designated core 2. Although each of the controlled windings may be wound on a separate core, it is preferable to utilize only two cores with the controlled windings in diagonally opposite legs of the bridge wound on the same core since, for proper operation, the cores on which diagonal legs of the bridge are wound must saturate together. Controlled windings 30 and 34 are connected in one branch circuit which is energized from a supply source of A.-C. potential, of a frequency such as 400 cycles per second, with unidirectional impedance elements or rectifiers 38 and 40 arranged in the circuit whereby current flows through the controlled windings only during one half cycle of the applied A.-C. potential. Similarly, controlled windings 32 and 36 are connected in a second branch circuit, in parallel with the controlled windings 30 and 34, and are energized in the same source of A.-C. potential, rectifiers 42 and 44 being disposed in a second branch circuit and phased so that current flows through the controlled windings 32 and 36 during the same half cycle of the A.-C. potential. Resistors 46 and 48 are provided in shunt with the rectifiers in the first and second branch circuits, respectively, and permit a predetermined current to flow through the controlled winding on the reverse half cycle of the A.-C. potential to thereby establish the proper reference flux level in the cores during the non-conducting half cycle of the bridge. A variable tap may be connected between one pair of rectifiers such as 42 and 44 and the resistor 48, to permit balancing of the bridge, under the zero control signal conditions. Alternatively, any other desired referencing circuit may be utilized such as those utilizing a separate reference winding. Control windings 50 and 52 are provided on the cores 1 and 2 respectively, and are arranged so that the current flowing therethrough in response to the application of either a D.-C. or an amplitude modulated A.-C. signal of the supply source frequency will differentially vary the flux levels preset in the cores during the non-conducting half cycle of the bridge.

Although the gain of a half-wave bridge type magnetic amplifier is higher when the control source impedance is small, it is necessary, for many servo applications, to provide a limiting resistance such as 54 of an impedance of the order of 10,000 ohms, in series with control windings.

The second stage of the amplifier is similar to the first and includes controlled windings 60 and 62 wound on a core of saturable magnetic material designated core 3 and controlled windings 64 and 66 wound on the core of saturable magnetic material designated core 4. As in the first stage, rectifiers 68 and 70 are provided in the branch circuits including controlled windings 60 and 64, and rectifiers 72 and 74 are provided in the branch circuit containing controlled windings 62 and 66. Biasing or referencing resistors 76 and 78 are provided in shunt with the rectifiers in the first and second branch circuits of the second stage, respectively.

In a half-wave magnetic amplifier, the control must be established in the cores during the non-conducting half cycle of that stage of the amplifier. The control windings 80 and 82 on cores 3 and 4 respectively, are connected to the output of the first stage of the amplifier, and consequently the second stage is energized from the supply source 180° out of phase with the first stage so that the second stage bridge circuit is conducting during the non-conducting half cycle of the first stage, and vice versa. Since the bridge type half-wave magnetic amplifier permits the direct coupling of the output of the first stage to the input of the second stage, without the use of passive elements therebetween, a high gain may be achieved by the use of two such stages.

The output of the half-wave bridge type magnetic amplifier appearing across the resistor 84, is a pulsating unidirectional signal for any given phase or polarity of the input signal, which pulsating unidirectional signal, contains a D.-C. component of an amplitude and polarity correlative with the input signal and an A.-C. component correlative in amplitude and phase with the input signal. Consequently, the output of the magnetic amplifier may be applied directly to an A.-C. amplifier or to an A.-C. or D.-C. motor. Additionally, since the output of the half-wave bridge type magnetic amplifier contains a D.-C. component, the latter may be applied to any suitable low-pass filter network to thereby obtain lead, lag or integral compensation for the servo system.

One such feedback circuit utilizing a low-pass filter is illustrated in Fig. 3 and comprises the R-C circuit including the resistor 86 and the condenser 88 connected across the output resistor 84. Since the half-wave bridge type magnetic amplifier is responsive to both A.-C. and D.-C. control signals, the D.-C. feedback voltage appearing across the condenser 88 may be applied directly to the control circuit including the control windings 50 and 52 in the first stage of the amplifier.

The polarity of the feedback, and the D.-C. gain of the amplifier determined the type of compensation obtained. Negative feedback from the compensation network comprising resistor 86 and condenser 88 produces lead compensation. Alternatively, positive feedback may be utilized in which event the compensation network and magnetic amplifier function as a lag compensating circuit, if the gain of the amplifier is less than 1, and function as an integral compensation network, in other words as an integrating network, when the D.-C. loop gain is equal to 1.

Obviously many modifications and variations are possible in the light of the above teachings. It is therefore to be understood that within the scope of the appended claims the invention may be practiced otherwise than as specifically described.

What is claimed as new and desired to be secured by Letters Patent of the United States is:

1. In a servo system having input and output members and a motor adaptable to drive said output member in response to an error signal produced in said servo system correlative with the displacement between said input and output members to compensate for deviations of said output member from a position corresponding to the position of said input member whereby said motor drives said output member to a position corresponding to the position of said input member; compensation circuit means for applying said error signal to said motor, said compensation circuit means comprising a half-wave bridge magnetic amplifier having a control circuit connected to receive said error signal to produce in the output of said amplifier a polarity reversible pulsating D.-C. output voltage containing both A.-C. and D.C. components correlative with the amplitude and polarity of said error signal, and a compensating feedback network for applying the D.-C. component of the output voltage of said amplifier as a feedback to said control circuit.

2. The combination of claim 1 wherein said feedback is positive.

3. The combination of claim 1 wherein said feedback is negative.

4. In a servo system including means for producing an error signal and a motor, compensation circuit means for applying said error signal to said motor, said compensation means comprising a magnetic amplifier including a pair of cores of saturable magnetic material each having a control winding and a controlled winding thereon, means connecting said controlled windings in separate parallel branch circuits, unidirectional impedance elements in each of said branch circuits arranged so that said cores are each driven to saturation on the same half-cycle of an A.-C. potential applied to said branch circuits, means connecting said control windings to said error signal producing means whereby the error signal differentially varies the flux levels of said cores to thereby produce as the output of said branch circuits a polarity reversible pulsating D.-C. output voltage containing both A.-C. and D.-C. components correlative with the amplitude and polarity of said error signal, coupling means connecting said motor to said branch circuits whereby the current of said output voltage flows through said motor, and feedback means for applying the D.-C. component of said output voltage to said control windings.

5. The combination of claim 4 wherein said feedback means comprises a low-pass resistance-capacitance filter network providing integral feedback.

6. The combination of claim 5 wherein said feedback is positive.

7. The combination of claim 5 wherein said feedback is negative.

8. The apparatus of claim 4 wherein said coupling means comprises a pair of saturable reactor cores each having a control winding and a controlled winding thereon, the control windings of said saturable reactor cores being connected in responsive relation to the output of said branch circuits whereby the flux levels of said saturable reactor cores are differentially varied in accordance with the output of said branch circuits, the controlled windings of said saturable reactor cores are connected to form another network of separate parallel branch circuits arranged so that said saturable reactor cores are each driven to saturation on the same half cycle of an A.-C. potential applied to said another network, the output of said another network being connected to said motor to apply an energizing voltage thereto; and wherein said feedback means comprises a resistance-capacitance network in the output of said another network, said resistance-capacitance network being connected to the first mentioned control windings for applying thereto said D.-C. component.

9. In a follow-up control system having rotatable input and output shafts and means for rotating said output shaft to a position corresponding to a predetermined position of said input shaft in response to a control signal which is a measure of the deviation of said output shaft from the said predetermined position of said input shaft; a compensation circuit for applying said control signal to said means and comprising, in combination, an amplifier characterized to translate A.-C. and D.-C. signals and having an input circuit connected to receive said control signal and an output circuit in which appears, in response to the application of said control signal to said input circuit, a polarity reversible pulsating D.-C. output voltage containing both D.-C. and A.-C. components correlative with the amplitude and polarity of said control signal; and a compensating feedback network for applying the D.-C. component of said output voltage to said input circuit.

10. The compensation circuit of claim 9 wherein said feedback network comprises a resistance-capacitance network interconnecting said output and input circuits.

11. The compensation circuit of claim 1 wherein said feedback network is an integrating circuit whereby said feedback is a voltage substantially proportional in amplitude to said error signal.

References Cited in the file of this patent

UNITED STATES PATENTS

| | | |
|---|---|---|
| 2,439,198 | Bedford | Apr. 6, 1948 |
| 2,446,567 | White et al. | Aug. 10, 1948 |
| 2,472,167 | Matson et al. | June 7, 1949 |
| 2,534,293 | Newton | Dec. 19, 1950 |

OTHER REFERENCES

Magnetic Amplifier Circuits, Geyger, page 193, Fig. 13.8, McGraw-Hill, 1954.